PROCESS FOR PREPARING LOW RESISTIVITY HIGH PURITY GALLIUM ARSENIDE

Original Filed July 1, 1965

INVENTORS
JERRY M. WOODALL
WILLIAM C. WUESTENHOEFER
BY
Thomas J. Kilgannon Jr.
ATTORNEY United States Patent Office 3,551,116
Patented Dec. 29, 1970

3,551,116

PROCESS FOR PREPARING LOW RESISTIVITY HIGH PURITY GALLIUM ARSENIDE

Jerry M. Woodall, Putnam Valley, and William C. Wuestenhoefer, Mahopac, N.Y., assignors to International Business Machines Corporation, Armonk, N.Y., a corporation of New York Continuation of application Ser. No. 468,898, July 1, 1965. This application June 4, 1968, Ser. No. 740,778
Int. Cl. B01j *17/00;* C01g *15/00*
U.S. Cl. 23—293 9 Claims

ABSTRACT OF THE DISCLOSURE

A heat treatment of high purity, high resistivity (semi-insulating) gallium arsenide to provide high purity, low resistivity gallium arsenide is described. The heat treatment causes the precipitation of acceptor impurities from the gallium arsenide crystal lattice which in turn affects the final resistivity of the heat treated gallium arsenide. The heat treatment may be carried out over a temperature range of 650°–950° and if heated for equilibrium times of 16–236 hours, minimum values of resistivity at a given temperature will be attained. The equilibrium time is that time at a given temperature beyond which further treating will produce no change in resistivity and increases with decreasing temperature. If heating is carried out for times less than equilibrium times the resistivity obtained will be higher than the minimum value. The process is reversible in that after heating for an equilibrium time at a given temperature, other minimum values of resistivity may be obtained by heating at different temperatures and equilibrium times.

Figure 1:
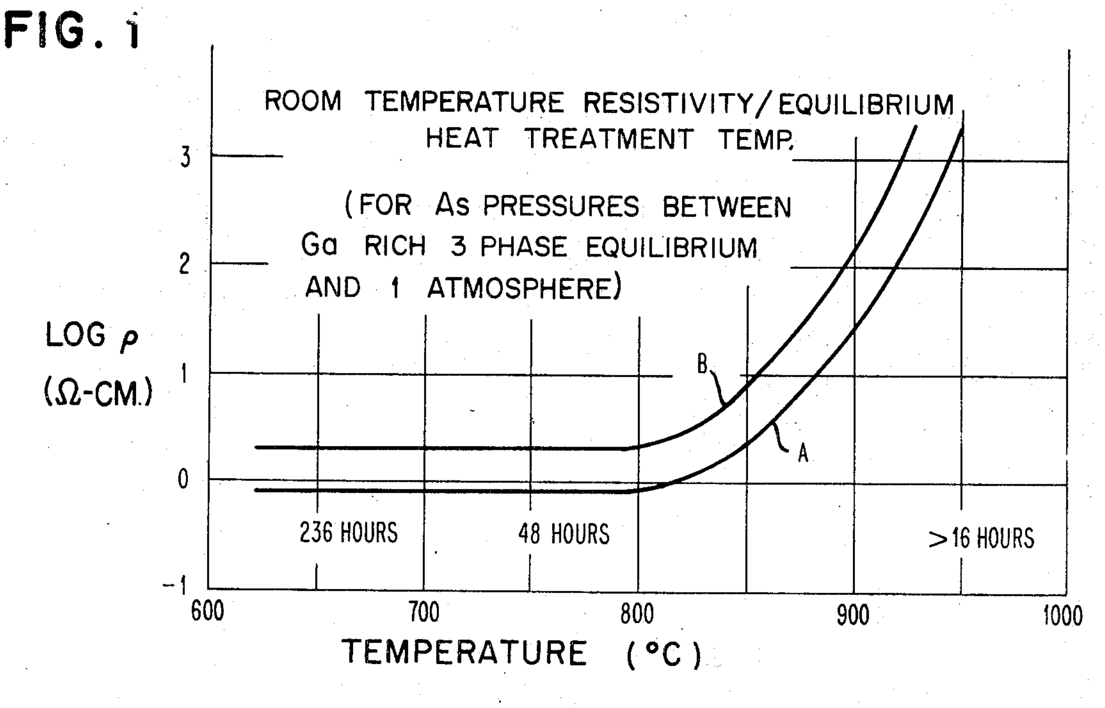

This application is a continuation of applicant's copending application Ser. No. 468,898, filed July 1, 1965, now abandoned.

Certain applications of gallium arsenide require that the gallium arsenide be of high purity and low resistivity. In addition, these applications require that the gallium arsenide be n-type and have mobilities of 6500–7500 cm./$^2$ volt second. There are several well-known techniques for producing high purity gallium arsenide but of high resistivity. Prior art efforts to make low resistivity material on the order of 1–10 ohm cm. have either been unsuccessful or, if successful, the results obtained have not been reproducible. In view of the requirements of the art for low resistivity gallium arsenide, a technique or method capable of consistently reproducing desired results would appear to be highly advantageous and useful.

It is, therefore, an object of this invention to provide a heat treating technique which provides high purity, low resistivity gallium arsenide crystals from gallium arsenide of high purity and resistivity.

Another object is to provide a method of producing high purity, low resistivity gallium arsenide crystals which is both reliable and reproducible.

Another object is to provide a technique for producing gallium arsenide crystals in which the resistivity values are variable with temperature.

Another object is to provide a technique for producing gallium arsenide crystals in which the resistivity values at a constant heat treating temperature are variable with time.

Yet another object is to provide a technique for producing low resistivity gallium arsenide in which the resistivity for a given temperature is a function of the silicon concentration of the starting material.

Another object is to provide a technique for producing gallium arsenide crystals having resistivities in the 0.5–500 ohm cm. range.

A feature of this invention is the utilization in a method for producing high purity, low resistivity gallium arsenide of the steps of heat treating gallium arsenide crystals having predetermined carrier concentrations for times and temperatures insufficient to permit donor diffusion from the bulk of the samples but sufficient to permit acceptor removal from the lattice of the crystals such that the carrier concentrations of the crystals are changed from the predetermined carrier concentrations.

Another feature is the utilization of the step of varying the time at which heat treating occurs to vary the amount of acceptor removal from the lattice of the crystals such that the carrier concentrations are varied from said predetermined concentrations.

Another feature is the utilization of the step of varying the temperature at which heat treating occurs to vary the amount of acceptor removal from the lattice of said crystals such that the carrier concentrations are varied from said predetermined concentrations.

Another feature is the utilization of the step of heat treating a crystal of semi-insulating gallium arsenide over a temperature range and for equilibrium times inversely proportional to the temperature within the range; the heat treating times and temperatures being insufficient to permit donor diffusion from the bulk of the crystal but sufficient to permit acceptor removal from the lattice of the crystals to provide a crystal having a given range of resistivities.

Another feature is the utilization of the step of heat treating a crystal of semi-insulating gallium arsenide over a temperature range of 650°–950° C. and for equilibrium times in the range of 16 hours to 236 hours; the heat treating times and temperatures being insufficient to permit donor diffusion from the bulk of said crystal but sufficient to permit acceptor removal from the lattice of said crystals to provide a crystal having a resistivity range of 0.5–500 ohm-cm.

Another feature is the utilization of the step of heat treating a crystal of semi-insulating gallium arsenide subsequent to the initial heat treating step at a temperature different from the initial temperature and having an equilibrium time different from the initial equilibrium time. The different temperature and time of heat treating are insufficient to permit donor diffusion from the bulk of the crystal but sufficient to permit acceptor removal from the lattice of the crystal and provide a crystal having a resistivity different from the initial low resistivity.

A further feature of this invention is the utilization in a process for preparing high purity, low resistivity, gallium arsenide, of a heat treating operation comprising the steps of introducing a high purity, semi-insulating gallium arsenide crystal into an enclosed chamber and heating the crystal in a temperature range between 650° and 950° C. for a period of from 16–236 hours to obtain a gallium arsenide crystal having a resistivity in the range of 0.5–500 ohm.-cm.

The foregoing and other objects, features and advantages of the invention will be apparent from the following more particular description of a preferred embodiment of the invention, as illustrated in the accompanying drawings.

In the drawings:

FIG. 1 is a plot of the log of resistivity vs. the temperature in degrees centigrade for arsenic pressures between gallium rich three phase equilibrium pressure and one atmosphere which shows the variation in resistivity of a sem-iinsulating gallium arsenide crystal with heat treating temperature. Each curve represents a crystal having a different silicon concentration in its crystalline structure prior to heat treating and indicates that the resistivity, in addition to being a function of temperature, is also a function of the silicon concentration of the crystal which in turn is dependent upon the oxygen pressure at which the crystal is initially grown.

Figure 2:
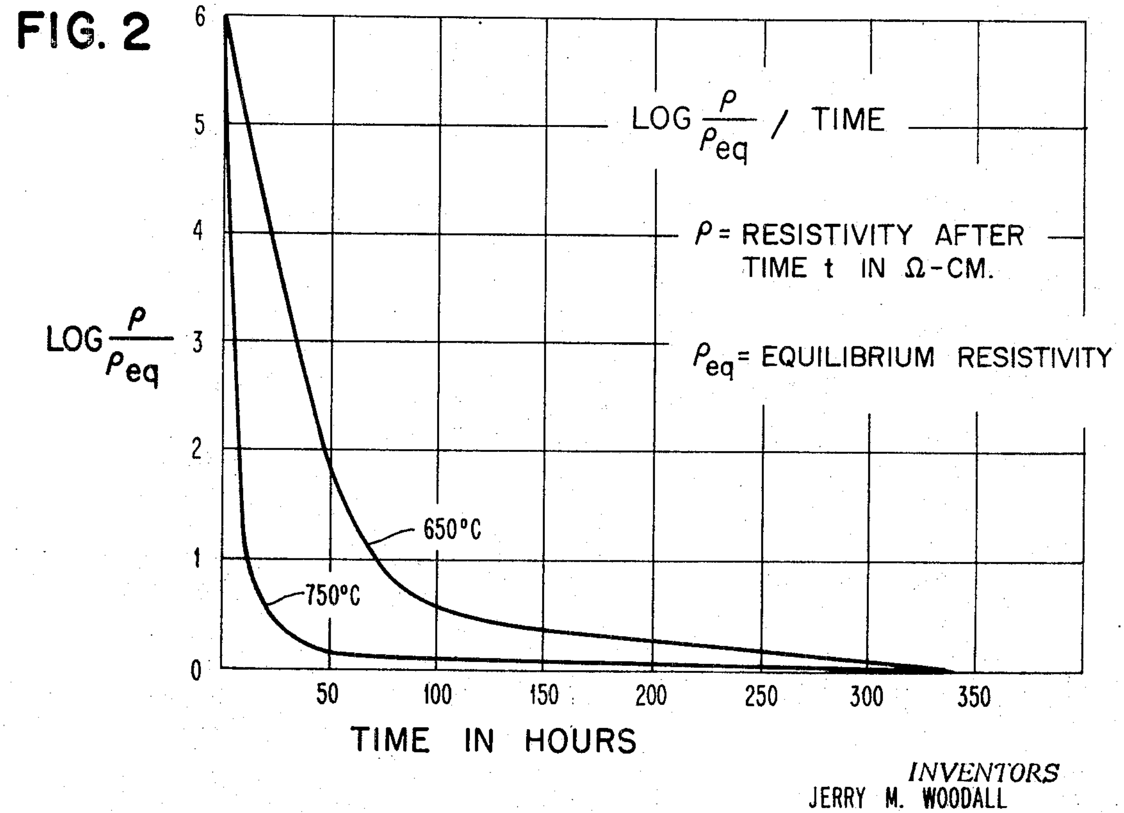

FIG. 2 shows a plot of the log of resistivity normalized to the equilibrium time resistivity vs. time. The plot indicates that for a given temperature, the resistivity of a crystal can be changed by varying the time, for times less than equilibrium times, at which a sample is heat treated.

In carrying out the invention disclosed herein, it is necessary that high purity crystals of gallium arsenide be first obtained. By high purity, it is meant that practically undetectable amounts of silicon or other materials remain in the crystal after its growth. Where only trace amounts of impurities remain in a crystal, the resistivities obtained may nevertheless be rather high. Where, for instance, silicon alone (a shallow donor) remains in trace amounts, the resistivities obtained are relatively low. The carriers contributed by silicon, for instance, reside in the conduction band at room temperature, because the activation energy of the silicon level is small compared to the thermal energy at room temperature, and because there is a large density of states in the conduction band. However, in addition to silicon, other impurities, even though undetectable by the usual analytical techniques usually are present which may be characterized as deep level impurities and/or shallow acceptor impurities. Under these circumstances, even though silicon can contribute carriers rather easily to the conduction band, the presence of the deep level and/or shallow acceptor impurities causes the carriers to be ultimately captured by the acceptor impurities thereby maintaining the resistivity at relatively high levels. The heat treatment technique of the present invention appears to overcome the effect of deep level and/or shallow acceptor impurity action and high purity, gallium arsenide single crystals of low resistivity are provided. Gallium arsenide crystals which are useful in the heat treating step of this invention may be obtained by a technique described in U.S. Pat. 3,322,501 issued May 30, 1967 entitled: "Preparation of Gallium Arsenide with Controlled Silicon Concentration" in the name of J. M. Woodall, and assigned to the same assignee as the present invention.

The major advantage resulting from the heat treating method of this invention is that it is possible to obtain low resistivity, high purity gallium arsenide crystals. As has been indicated above, most prior art methods provide low resistivity, low purity gallium arsenide. The gallium arsenide resulting from the suppression of silicon formation within the crystal by the method of the patent mentioned hereinabove is of high resistivity and high purity and is the starting material from which the low resistivity, high purity material results after heat treating in accordance with this invention.

In connection with the high resistivity (semi-insulating), high purity starting material, it should be appreciated that the resistivity of the starting material may vary considerably depending upon the concentration of silicon in the gallium arsenide. As described in the above mentioned patent the silicon concentration in the gallium arsenide is, in turn, dependent on the oxygen pressure during the growth of the crystal. Specifically, when preparing gallium arsenide crystals by the method of the patent, the reaction between gallium and silicon (silica boats are used as containers for gallium) is suppressed by virtue of the pressure exerted by an atmosphere of gallous oxide ($Ga_2O$). The gallous oxide atmosphere is produced by the reaction of carbon with gallic oxide ($Ga_2O_3$) in accordance with the following reaction:

$$2C+Ga_2O_3\rightarrow Ga_2O+2CO$$

Interestingly enough, the end products of the reaction are non-contaminating to the resulting crystal of gallium arsenide.

Silica contamination of the gallium arsenide is believed to result from the following reaction:

$$4Ga+SiO_2\rightarrow 2Ga_2O+Si$$

The production of gallous oxide ($Ga_2O$) from the above reaction, tends to prevent the reaction of gallium and silica and the amount of silica contamination in the resulting crystal is proportional to the pressure of the gallous oxide present. Since the pressure of the gallous oxide atmosphere is a function of temperature during the reaction of gallic oxide and carbon, it is possible by simply varying the position of the carbon boat in a temperature gradient to obtain different silicon concentrations. From this, it may be seen that it is possible to fix the concentration of the donors in the crystal and high purity, high resistivity compensated n-type gallium arsenide results. The effects of silicon concentration in the heat treatment method of the present invention will be detailed in what follows.

Broadly, the method of the present invention consists mainly in a heat treatment step in which heat applied to a sample of semi-insulating, high purity gallium arsenide for a given time and temperature provides a crystal which is of low resistivity and high purity. It is believed that the heat treatment step causes the removal of acceptor impurities from the crystal lattice so that the resistivity is substantially reduced. It should be recalled, at this point, that $$n=N_D-N_A$$

where $n$=carrier concentration;
$N_D$=number of donors;
$N_A$=number of acceptors.

Further, it should be recalled that $$\rho\sim\frac{1}{N_D-N_A}$$

where $\rho$=resistivity in ohm-cm.

Thus, any effect on the carrier concentration will have an effect upon the resistivity of a particular crystal. As has been indicated above, the number of donor impurities ($N_D$) is fixed in any given sample by the gallous oxide pressure maintained during crystal growth. Since the number of donors ($N_D$) in any sample is fixed, the mechanism whereby the resistivity is affected appears to depend, as will be shown below, on varying the acceptor ($N_A$) concentration.

After providing a sample of semi-insulating gallium arsenide having a given silicon concentration, the sample is introduced into an enclosed chamber; evacuated to a desired pressure and sealed off. The sample is then placed in a furnace and heated to a temperature in the range of 650°–950° C. for a period of 16–236 hours. The heat treatment provides a sample which may have resistivities ranging from 0.5–500 ohm-cm. FIG. 1, which shows the logarithm of room temperature resistivity of a gallium arsenide sample versus equilibrium heat treatment temperatures for arsenic pressures between gallium rich three phase equilibrium and one atmosphere indicates that resistivities which vary over a relatively wide range are obtainable. The points for curve A were obtained utilizing a crystal grown from a system in which the weight of gallium arsenide was 83 grams; the weight of gallic oxide ($Ga_2O_3$) was 5.9 mg. and in which the volume was 65 cc. The weight of gallic oxide is significant in that it is this constituent which, during crystal growth, determines the gallous oxide pressure. Curve B represents the resistivities obtained from another sample grown under the same conditions except that the amount of gallic oxide used was 8.3 mg. For the same temperatures and equilibrium times, the resistivity in curve B is higher over the whole temperature range. The higher resistivities of curve B result from the fact that during growth a higher gallous oxide pressure was attained resulting in greater suppression of silicon contamination in the crystal. If the amount of donors ($N_D$) is reduced, the carrier concentration is reduced and the resistivity is consequently higher. It follows then that a whole family of curves similar to curves A and B can be generated for the same range of equilibrium times and temperature and that a wide range of resistivities can be attained by simply controlling the concentration of donors during crystal growth.

Referring again to FIG. 1, it is seen that as the temperature increases, the resistivity also increases. However, the change in resistivity is not simply a function of temperature, it is also a function of time. This time may be characterized as an equilibrium time and is defined as the amount of time at a given heat treating temperature after which no significant change in resistivity occurs. Curves A and B show the minimum value of resistivity attainable after heating for equilibrium times. The equilibrium times are indicated under the associated heat treating temperature. It should be understood that heat treating at any given temperature may be undertaken for times less than the equilibrium times, but, in such instances, resistivities higher than equilibrium resistives will be obtained. Equilibrium resistivity is that resistivity obtained after heating at a given temperature for an equilibrium time.

FIG. 2 shows a plot of the logarithm of resistivity for times less than equilibrium time normalized to the equilibrium resistivity versus time for heat treatment temperatures of 650° and 750° C. It should be recalled at this point, that the equilibrium resistivity is the minimum resistivity attainable at any given temperature. Thus, the resistivity after any time less than an equilibrium time will always be greater than the equilibrium resistivity. The curves of FIG. 2 clearly show the variation from very high values of resistivity and short heat treating times to extremely low values of resistivity at extended heat treating times. It is significant that when different heat treating temperatures are utilized that a rather wide variation in resistivity can be attained for the same heat treating time.

This is particularly so in the range of heat treating times between 0 and 100 hours.

One of the outstanding characteristics of the method of the present invention is the fact that, after heat treating for an equilibrium time at a given temperature and an equilibrium resistivity is obtained, it is possible to heat treat the resulting crystal at any other temperature for an equilibrium time and obtain a different value of resistivity. Thus, in FIG. 1, it would be possible to follow along curve A by simply heating at the appropriate temperature for the proper equilibrium times and obtain the desired equilibrium resistivities. It is also possible to change the resistivity from the low resistivity values to the high resistivity values by heat treating at the appropriate times and temperatures. In other words, the process is completely reversible in that a sample having a given equilibrium resistivity is provided by heat treating for the appropriate times. Heat treating at times and temperatures other than equilibrium values will, of course, provide different resistivities from the equilibrium values and will not follow along the minimum resistivity curves of FIG. 1.

The variations in resistivities obtainable due to the variations in silicon concentration have been explained above as being dependent on the donor concentration prior to heat treatment. The other variations in resistivity with changes in temperature and time of heat treatment are believed to be due to the variation in the amount of acceptor impurities within the lattice of the gallium arsenide crystal. Even at the greatest heat treating times, it is known that such times are insufficient to permit donor diffusion from the bulk of the gallium arsenide crystal. The times and temperatures utilized are, however, sufficient to permit acceptor precipitation from the crystal lattice.

It is generally known that solubility of the impurities is inversely proportional to the temperature. Thus, the lower the temperature the more likely is precipitation of the acceptors to take place in order to reduce the free energy of the system. The fewer the acceptors remaining, the lower is the resistivity of the resulting crystal. The curves of FIG. 1 show this trend having lower resistivitives at the lower temperatures. The fact that the times of heat treating are insufficient to permit donor diffusion from the bulk coupled with the solubility-temperature characteristic of acceptors, indicates that the change in resistivities is indeed due to a change in the amount of acceptors ($N_A$) by heat treating. This belief is further substantiated by the fact that the resulting crystals are n-type, low resistivity, high purity crystals of gallium arsenide.

From the foregoing, it should be appreciated that the impurities on an electronic level rather than a chemical level are being changed. Thus, from a chemical analysis point of view, one might find the same concentration of acceptor impurities in a given sample of heat treated gallium arsenide and a certain resistivity could be predicted upon these measurements. However, on the electronic level, acceptors appear to be removed from the crystal lattice such that, at the lowest heat treating temperatures, low resistivity gallium arsenide is obtainable.

The following examples indicate the specific steps required before, during and after heat treatment.

EXAMPLE 1

A sample of semi-insulating gallium arsenide is obtained utilizing the technique described in the U.S. Pat. 3,322,501 entitled: "Preparation of Gallium Arsenide with Controlled Silicon Concentration" and referred to hereinabove. The sample of gallium arsenide which weighs approximately 5 to 10 grams is etched in 1:3:4, $HE:HNO_3H_2O$ to remove sawing and lapping damage. After a rinse in de-ionized water, the samples are soaked in a 10% KCN aqueous solution. Following a second rinse in de-ionized water, the sample is dried on filter paper. The sample is then loaded into suitably prepared silica or other suitable non-contaminating ampule. The ampule with sample is evacuated to $10^{-6}$ torr and sealed off. The ampule is placed into a pre-heated horizontal muffle furnace such that there is no temperature gradient across the sample. The sample is then heat treated to any of the temperatures and for the associated equilibrium or other time periods to provide a sample having any value of resistivity desired. The temperature utilized is between 650° C. and 950° C. The heat treatment is terminated by placing the ampule in air at room temperature.

EXAMPLE 2

Heat treat a sample resulting from the heat treatment of Example 1 to a higher or lower temperature to obtain a resistivity which is higher or lower than the starting resistivity. The step indicates the reversibility of the method of this invention.

EXAMPLE 3

The steps undertaken in this example are the same as those described in Example 1 except that the ampule rather than being evacuated is heat treated at arsenic pressure which may range from between 1 atmosphere and gallium rich 3 phase equilibrium, with and without excess gallium.

While the invention has been particularly shown and described with reference to a preferred embodiment thereof, it will be understood by those skilled in the art that various changes in form and details may be made therein without departing from the spirit and scope of the invention.

What is claimed is:

1. A process for producing high purity low resistivity gallium arsenide crystals comprising the steps of:

introducing a semi-insulating crystal of gallium arsenide into an enclosed chamber, evacuating said enclosed chamber and, heating said crystal to a temperature in a temperature range between 650° and 950° C. for an equilibrium time in the range of 16–236 hours, said time being insufficient to permit donor diffusion from the lattice of said crystal but sufficient to permit acecptor precipitation therefrom to obtain a crystal having an equilibrium resistivity in the range of 0.5 to 500 ohm-cm. said equilibrium time decreasing with increasing temperature.

2. A process according to claim 1 wherein the step of heating is carried out at a temperature in said temperature range for a time less than said equilibrium time to provide a resistivity higher than said equilibrium resistivity.

3. A process accordng to claim 1 wherein said heating is carried out in an arsenic atmosphere.

4. A process according to claim 1 wherein said gallium arsenide crystal is n-conductivity type.

5. A method for changing the concentration of electrically active acceptors in the lattice of a semi-insulating gallium arsenide single crystal containing acceptor and donor impurities comprising the step of:

heating said gallium arsenide crystal in one of an evacuated chamber and an arsenic filled chamber for an equilibrium time in the range of 16 to 236 hours and at a temperature in the range of 650°–950° C. to permit acceptor removal from the lattice of said crystal, said time of heating increasing with decreasing temperature, said heating providing a minimum value of resistivity in the range of 0.5–500 ohm-cm., said resistivity decreasing with decreasing temperatures.

6. A method according 5 wherein the step of heating is carried out at a temperature in said temperature range for a time less than said equilibrium time to provide a value of resistivity higher than said minimum value of resistivity.

7. A method according to claim 5 further including the step of:

heating said gallium arsenide crystal subsequent to said first mentioned heating step for an equilibrium time different from said first mentioned equilibrium time and at a temperature different from said first mentioned temperature to permit different amounts of one of acceptor replacement in and acceptor removal from the lattice of said crystal to provide a minimum value of resistivity different from said first mentioned value.

8. A method according to claim 5 further including the step of:

heating said gallium arsenide crystal subsequent to said first mentioned heating step for an equilibrium time longer than said first mentioned equilibrium time and at a temperature lower than said first mentioned temperature to permit increased removal of acceptors from the lattice of said crystal to provide a minimum value of resistivity lower than said first mentioned minimum value of resistivity.

9. A method according to claim 5 further including the step of:

heating said gallium arsenide crystal subsequent to said first mentioned heating step for an equilibrium time shorter than said first mentioned equilibrium time and at a temperature higher than said first mentioned temperature to permit increased replacement of acceptors in the lattice of said crystal to provide a minimum value of resistivity higher than said first mentioned minimum value of resistivity.

References Cited

UNITED STATES PATENTS

| | | | |
|---|---|---|---|
| 3,175,975 | 3/1965 | Fuller | 252—62.3 |
| 3,218,205 | 11/1965 | Ruehrwein | 23—294X |
| 3,260,573 | 7/1966 | Ziegler | 23—301 |
| 3,371,051 | 2/1968 | Johnson et al. | 252—518 |

FOREIGN PATENTS

| | | | |
|---|---|---|---|
| 727,678 | 4/1955 | Great Britain | 23—301SP |
| 1,002,741 | 2/1957 | Germany | 23—301SP |

OTHER REFERENCES

F. A. Cunnell et al., Technology of Gallium Arsenide, Solid State Electronics, vol. 1, pp. 97–106, Pergamon Press, 1960.

NORMAN YUDKOFF, Primary Examiner

R. T. FOSTER, Assistant Examiner

U.S. Cl. X.R.

252—62.3; 23—204